United States Patent
Mobley et al.

(10) Patent No.: US 6,902,208 B1
(45) Date of Patent: Jun. 7, 2005

(54) GAS IMPERMEABLE TUBE JOINT AND METHOD OF FORMING SAME

(75) Inventors: John E. Mobley, Lexington, TN (US); Michael O. Thurston, Henderson County, TN (US); Christopher W. Smith, Lexington, TN (US)

(73) Assignee: Dayco Product, LLC, Miamisburg, OH (US)

( * ) Notice: Subject to any disclaimer, the term of this patent is extended or adjusted under 35 U.S.C. 154(b) by 0 days.

(21) Appl. No.: 10/732,841

(22) Filed: Dec. 10, 2003

(51) Int. Cl.[7] ............................................. F16L 13/14
(52) U.S. Cl. .................... 285/331; 285/423; 285/21.1; 285/222.4; 156/73.5
(58) Field of Search ............................... 285/331, 423, 285/222.1–222.5, 21.1; 156/73.5; 228/2.1

(56) References Cited

U.S. PATENT DOCUMENTS

| | | | | |
|---|---|---|---|---|
| 4,353,761 A | * | 10/1982 | Woerz et al. ................. 156/69 |
| 4,784,409 A | * | 11/1988 | Piechowiak ................ 285/21.1 |
| 4,892,227 A | * | 1/1990 | MacLaughlin .............. 220/270 |
| 5,383,087 A | * | 1/1995 | Noone et al. ................ 361/215 |
| 5,415,316 A | | 5/1995 | Pemberton et al. ......... 220/562 |
| 5,469,892 A | * | 11/1995 | Noone et al. ................ 138/121 |
| 5,524,673 A | * | 6/1996 | Noone et al. ................ 138/103 |
| 5,566,720 A | * | 10/1996 | Cheney et al. .............. 138/137 |
| 5,752,725 A | * | 5/1998 | El-Sobky ................... 285/21.1 |
| 5,884,671 A | * | 3/1999 | Noone et al. ................ 138/137 |
| 5,947,153 A | | 9/1999 | Bucci et al. ................. 137/588 |
| 6,074,717 A | * | 6/2000 | Little et al. ................. 428/35.7 |
| 6,199,916 B1 | * | 3/2001 | Klinger et al. ........... 285/288.1 |
| 6,260,578 B1 | | 7/2001 | Kuehnemund et al. ..... 137/592 |
| 6,293,312 B1 | | 9/2001 | Stripe ......................... 138/141 |
| 6,453,941 B1 | * | 9/2002 | Milhas et al. ............... 137/515 |
| 6,540,868 B1 | * | 4/2003 | Kertesz .................... 156/304.2 |
| 6,591,871 B2 | * | 7/2003 | Smith et al. ................ 138/137 |
| 6,733,047 B1 | * | 5/2004 | Stieler ........................ 285/319 |
| 6,832,785 B1 | * | 12/2004 | Zitkovic, Jr. ............... 285/21.1 |
| 2001/0018485 A1 | | 8/2001 | Matsuoka et al. .......... 524/492 |
| 2001/0037795 A1 | * | 11/2001 | Stieler ........................ 123/456 |
| 2002/0059954 A1 | | 5/2002 | Aoki et al. ................. 137/202 |

* cited by examiner

*Primary Examiner*—Eric K. Nicholson
(74) *Attorney, Agent, or Firm*—Joseph V. Tassone; Wiggin and Dana LLP

(57) ABSTRACT

A method of forming a gas impermeable joint in a fluid system includes: providing a tube having a metallic barrier layer disposed between an inner plastic layer and an outer plastic layer; forcing at least one of the inner plastic layer and the outer plastic layer into contact with a plastic surface of a component; and welding the at least one of the inner plastic layer and the outer plastic layer with the plastic surface to form the gas impermeable joint. The welding may include: spin welding, hot plate welding, vibration welding, and ultrasonic welding. The metallic barrier layer extends substantially to the component, thus improving the gas impermeability of the joint between the tube and the component.

18 Claims, 9 Drawing Sheets

NOMINAL

OVER

GAS IMPERMEABLE TUBE JOINT AND METHOD OF FORMING SAME

BACKGROUND

This invention relates to the joining of tubes to other components in fluid systems. More specifically, this invention relates to gas impermeable tube joints and methods for forming gas impermeable tube joints in fluid systems.

In general, fluid systems serve to contain a fluid (e.g., a liquid, vapor, gas) as it is transported from one location to another. Fluid systems typically include a number of components interconnected by one or more tubes, which transport the fluid between the components. The components and tubes are connected together by joints, which allow the fluid to flow between the components and tubes while preventing leakage of the fluid from the system.

For certain fluid systems, it is important to prevent the infiltration or escape of the fluid in its gaseous state. One such fluid system, for example, is a fuel fill system in a motor vehicle, through which fuel is delivered to a storage tank. The escape of fuel vapor from fuel fill systems can be hazardous to the environment, and as a result, the U.S. Environmental Protection Agency prescribes limits to the amount of fuel vapor that may escape from the filler pipe. Another example of such a fluid system, is a radiant heating system found in homes and businesses. Often times hoses in a radiant heating system supply water or other heating fluid to heat exchangers located in floors, ceilings, roofs, and concrete or asphalt slabs. The hoses may be embedded in the surfaces to be heated. A significant problem with such hoses is that they are subject to gas infiltration and exfiltration. Oxygen is particularly troublesome because it is able to penetrate all known plastic films, at least to some small degree. Once oxygen has gained entry to such a heating system, it deteriorates the hoses and corrodes the pumping system. These are only a few examples of systems requiring gas impermeable tube joints and there are myriad fluid systems for which the prevention of the infiltration or escape of gas is critical to operation.

One way to reduce the infiltration or escape of gas in a fluid system is through the use of tubes having metallic barrier layers. For example, U.S. Pat. No. 6,074,717 to Little et al., describes a flexible hose that has an aluminum barrier layer for preventing ingestion of oxygen and other gasses. The aluminum barrier layer is securely bonded between two adhesion tubes which are vulcanized in place against the aluminum. The resulting tube is flexible and substantially gas impermeable. While such tubing is sufficiently gas impermeable to prevent the permeation of gas along the tube, the joints between tubes and components remain an area where the infiltration or escape of gas can occur.

Typically, the joints in such fluid systems are formed by sliding the tube over a projection on the component, and securing the tube in-place by way of a barb formed on the projection and/or a mechanical fastener (e.g., a hose clamp). Problematically, this method may allow for the permeation of gas through the joint connection. If the tube has a metallic layer, the permeation may be worse because of the relative inflexibility of the tube material and the resulting inability of the tube to form a tight fit with the projection.

Thus, there is a need for gas impermeable tube joints and methods for forming gas impermeable tube joints in fluid systems.

BRIEF SUMMARY OF THE INVENTION

The above-described and other drawbacks and deficiencies of the prior art are overcome or alleviated by a method of forming a gas impermeable joint in a fluid system. The method includes: providing a tube having a metallic barrier layer disposed between an inner plastic layer and an outer plastic layer; forcing at least one of the inner plastic layer and the outer plastic layer into contact with a plastic surface of a component; and welding the at least one of the inner plastic layer and the outer plastic layer with the plastic surface to form the gas impermeable joint. The welding may include: spin welding, hot plate welding, vibration welding, and ultrasonic welding.

In one embodiment, the component includes a recess disposed therein, the recess being dimensioned to receive an end of the tube, and the plastic surface of the component being formed within the recess to contact at least one of the inner plastic layer and the outer plastic layer. In another embodiment, the component includes a cylindrical protrusion, the plastic surface being formed on either the outer circumference or the inner circumference of the cylindrical protrusion.

The thickness of the inner plastic layer and the outer plastic layer before welding is preferably greater than about 0.6 millimeters, and more preferably greater than about 1 millimeter. The thickness of the inner plastic layer and the outer plastic layer before welding may be between about 0.6 millimeters and 1.5 millimeters, and more preferably between about 1 millimeter and 1.2 millimeters.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

The invention will be more fully understood from the following detailed description taken in conjunction with the accompanying drawings wherein like elements are numbered alike, and in which.

DETAILED DESCRIPTION

Figure 1:
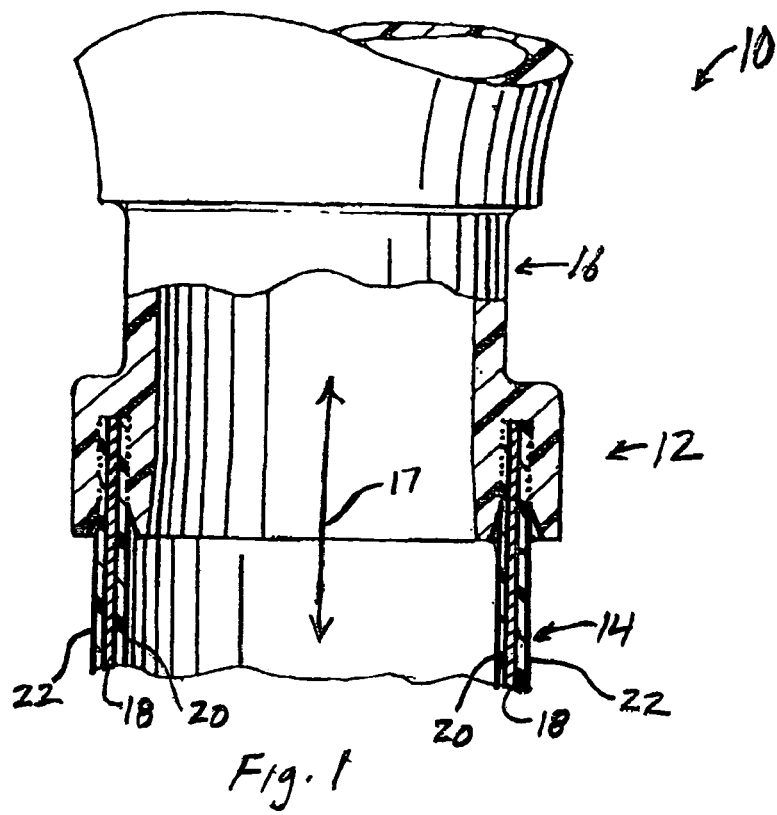
FIG. 1 is a partial cross-sectional view of a portion of a fluid system including a gas impermeable tube joint in accordance with an embodiment of the present invention.

FIG. 1 is a partial cross-sectional view of a portion of a fluid system 10 including a gas impermeable tube joint 12. The fluid system 10 includes a tube 14 having an end coupled to a component 16 via the joint 12, which allows fluid to be communicated between the tube 14 and the component 16 as indicated by arrow 17. The component 16 may be any component in the fluid system 10 such as, for example a pump, funnel, tank, heat exchanger, valve, tube-to-tube coupling, flange, quick disconnect coupling, filter, and the like. For example, component 16 may be a funnel used within a fuel fill system in a motor vehicle, as described in commonly owned U.S. patent application Ser. No. 10/732,861 to Swane, filed concurrently herewith and entitled "Fuel Fill System", which is incorporated by reference herein in its entirety. The component 16 may also be another tube. It will be appreciated that the fluid system 10 may include any number of joints 12 connecting tubes 14 to components 16.

Figure 2:
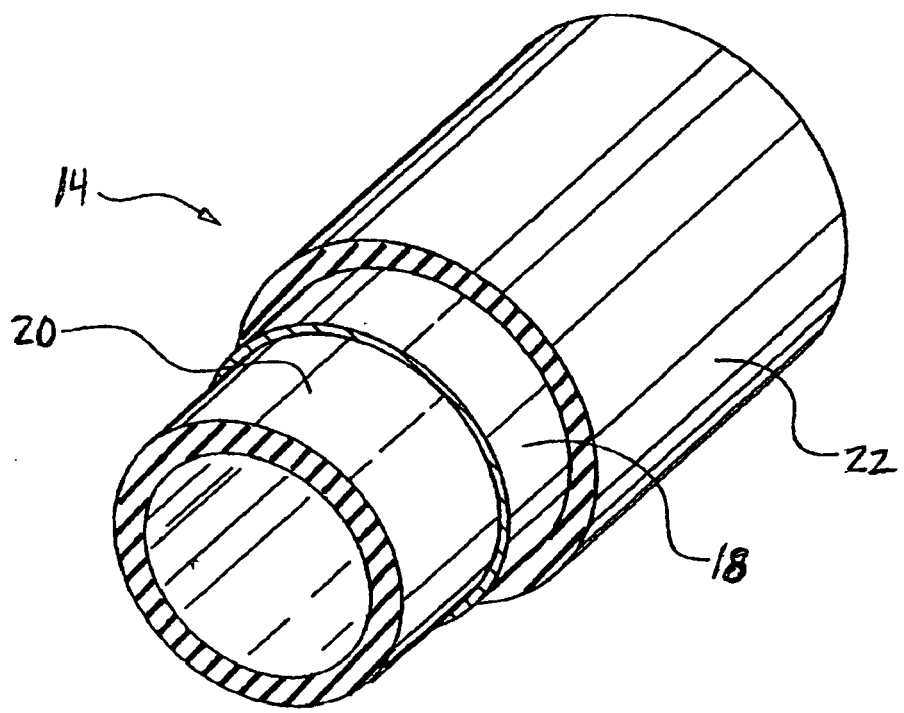
FIG. 2 is a perspective view of a tube having a metallic barrier layer.

Referring to FIGS. 1 and 2, the tube 14 is formed by a metallic barrier layer 18 disposed between an inner plastic layer 20 and an outer plastic layer 22. The metallic barrier layer 18 extends along the entire length of the tube 14. The joint 12 is formed by welding at least one of the inner plastic layer 20 and the outer plastic layer 22 to a plastic surface formed on the component 16. As will be discussed in further detail hereinafter, the weld may be performed using spin welding, hot plate welding, vibration welding, ultrasonic welding, and the like. Advantageously, because the weld is formed with the outer and/or inner plastic layers 20, 22 of the tube 14, the metallic barrier layer 18 extends substantially to the component 16, thus improving the gas impermeability of the joint 12 between the tube 14 and the component 16. The joint 12 is also lightweight and corrosion resistant.

The inner and outer plastic layers 20, 22 of the tube 14 may be formed from any thermoplastic material. For example, the inner and outer plastic layers 20, 22 may be formed from polyethylene, polypropylene, acetals, nylons, fluoropolymers, rubbers, and combinations, composites, or multiple layers of any of the foregoing. The metallic layer 18 may be formed from any metal in sufficient quantity to prevent permeation of gas into or out of the system 10. Preferably, the metallic layer 14 is formed from a malleable metal such as aluminum, steel, tin, copper, brass, or combinations or alloys formed from one or more of the foregoing.

One example of a tube 14 that may be used with the present invention is described in U.S. Pat. No. 6,074,717, which is incorporated by reference herein in its entirety. The '717 patent describes a tube wherein the inner plastic layer 20 is formed by a first tube, the metallic barrier 18 is formed by an aluminum foil bonded exteriorly about the first tube, and the outer plastic layer 22 is formed by a second tube bonded exteriorly about the aluminum foil. The aluminum foil may be between about 0.0005 and 0.030 inches thick. The first tube and the second tube (i.e., inner and outer plastic layers 20, 22) each comprise about 20 percent by weight of ethylene propylene diene polymethylene (EPDM) rubber and from about 2 to 9 percent by weight of polybutadiene-maleic anhydride adduct resin. The formulation preferably includes about 2–8 percent by weight of active peroxide as a curing agent. The peroxide cure is performed in any conventional manner at a temperature of about 325° F., and provides a strong bond between the aluminum metallic barrier layer 18 and the inner and outer layers 20, 22. Suitable conventional black and non-black filler ingredients, and paraffinic or naphthenic plasticizers may be added to the mixture as desired. In addition, one or more reinforcement layers (not shown) may be added to the outer surface of the outer plastic layer 22. The reinforcement layer may be fabricated from, for example, rayon, polyester, polyvinyl acetate, wire, aramid, or any other suitable material. The reinforcement layer may also include a cover selected from any of numerous thermosetting elastomeric compounds such as natural rubber, styrene butadiene, polychloroprene, acrylonitrile butadiene, chlorosulfonated monomer, or chlorinated polyehtelene. Where the outer plastic layer 22 is used to form the weld, a portion of the reinforcement layer will be removed to expose the outer plastic layer 22 for welding.

Figure 3:
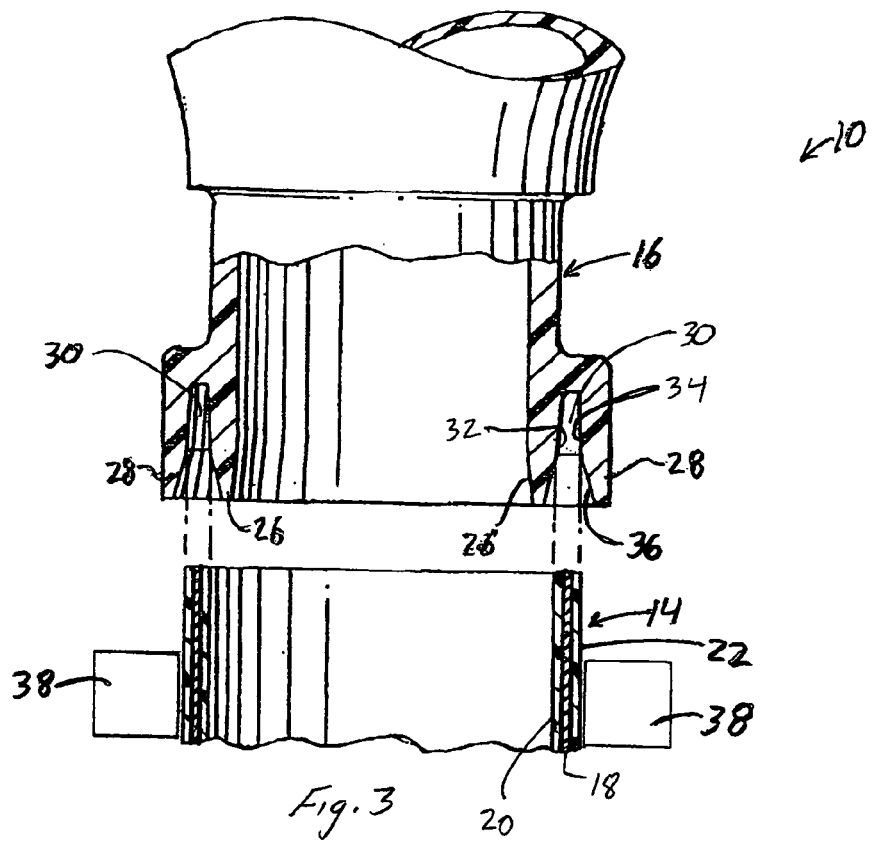
FIG. 3 is a partial cross-sectional view of an end of the tube separated from the component before welding.
Figure 4:
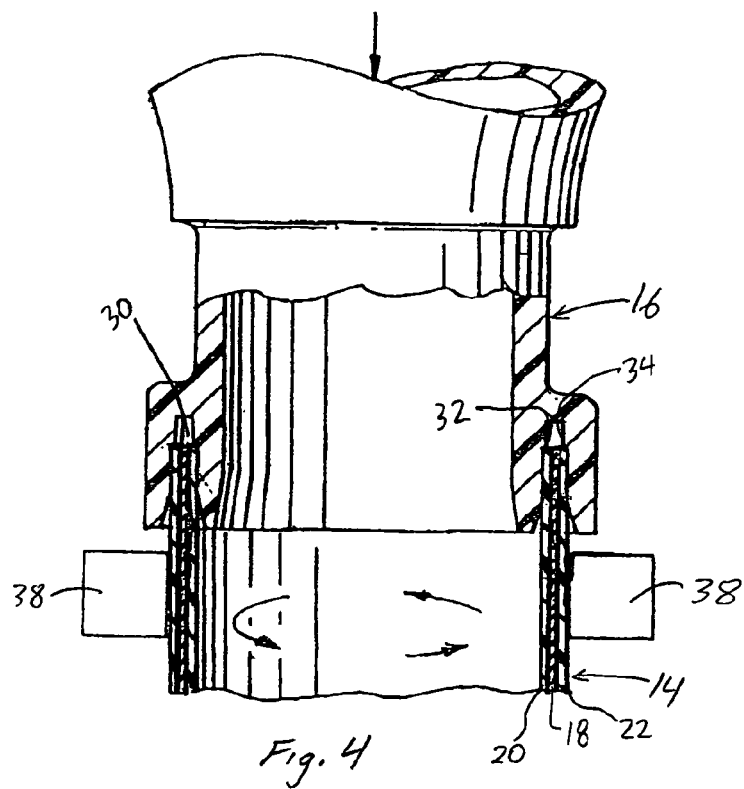
FIG. 4 is a partial cross-sectional view of an end of the tube forced onto the component before welding.

Referring to FIG. 3, the tube 14 and component 16 are shown separated, before welding. In the embodiment shown, the component 16 includes a generally cylindrical inner protrusion 26 and a coaxial, generally cylindrical outer protrusion 28. An annular recess 30 is formed between an outer surface 32 of the inner protrusion 26 and an inner surface 34 of the outer protrusion 28. The annular recess 30 is dimensioned to receive an end of the tube 14, as shown in FIG. 4. The inner and outer surfaces 32, 34 may be angled relative to each other such that the end of the tube 14 becomes wedged within the recess 30 when forced therein. A relief cut 36 may be provided at the inlet end of the annular recess 30 to ease insertion of the end of the tube 14 into the recess 30.

The component 16 may be molded from a plastic material such that one or more of the surfaces 32, 34 form the one or more plastic surfaces to which the tube is welded. Alternatively, the plastic surfaces 32 and/or 34 may be formed by inserts secured to the component 16.

Figure 5:
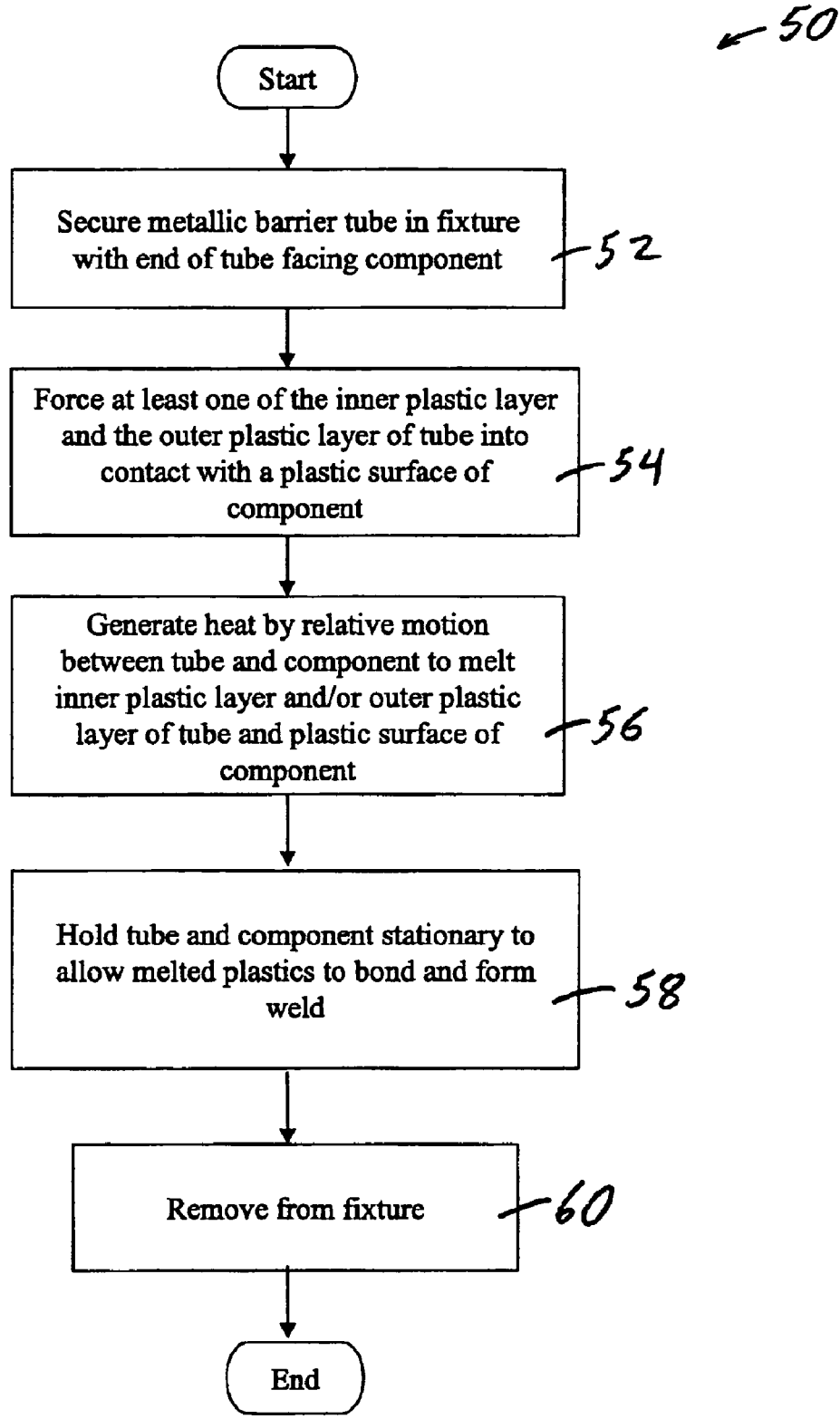
FIG. 5 is a flow chart depicting a method of forming the gas impermeable joint.

FIG. 5 is a flow chart depicting a method 50 of forming the gas impermeable joint 12 of FIG. 1. Referring to FIGS. 1–5, the method 50 can be described. With the tube 14 separated from the component 16, as shown in FIG. 3, the tube 14 is secured in a fixture 38 with the end of the tube 14 facing the component 16 (block 52 of method 50). The fixture 38 may be a chuck disposed on the outside of the tube 14, a chuck disposed inside the tube 14, or a combination of both. Preferably, the inner and outer protrusions 26, 28 of the component 16 are sufficiently rigid such that they need not be held by a chuck. However, where the component is a tube or where the inner and outer protrusions 26, 28 are not rigid, the inner and outer protrusions 26, 28 may also be secured by a separate chuck. Next, the tube 14 is forced onto the component 16 such that at least one of the inner plastic layer 20 and the outer plastic layer 22 come into contact with a plastic surface 32 and/or 34 of the article 16 (block 54). In the embodiment shown, the outer plastic layer 22 contacts the inner plastic surface 34 and the inner plastic layer 20 contacts the outer plastic surface 32. The inner and/or outer plastic layers 20, 22 are then moved relative to the plastic surface(s) 32, 34 to create frictional heat (block 56). The relative motion may be created by spinning, vibration, ultrasound, or any other convenient method which results in melting of the inner and/or outer plastic layers 20, 22 and the plastic surface(s) 32, 34. After the layers 20, 22 and surfaces 32, 34 have melted, the relative motion is stopped and the tube 14 and component 16 are held stationary to allow the melted plastics to bond and form a weld (block 58). The joined tube 14 and component 16 are then removed from the fixture 38 (block 60).

Figure 6:
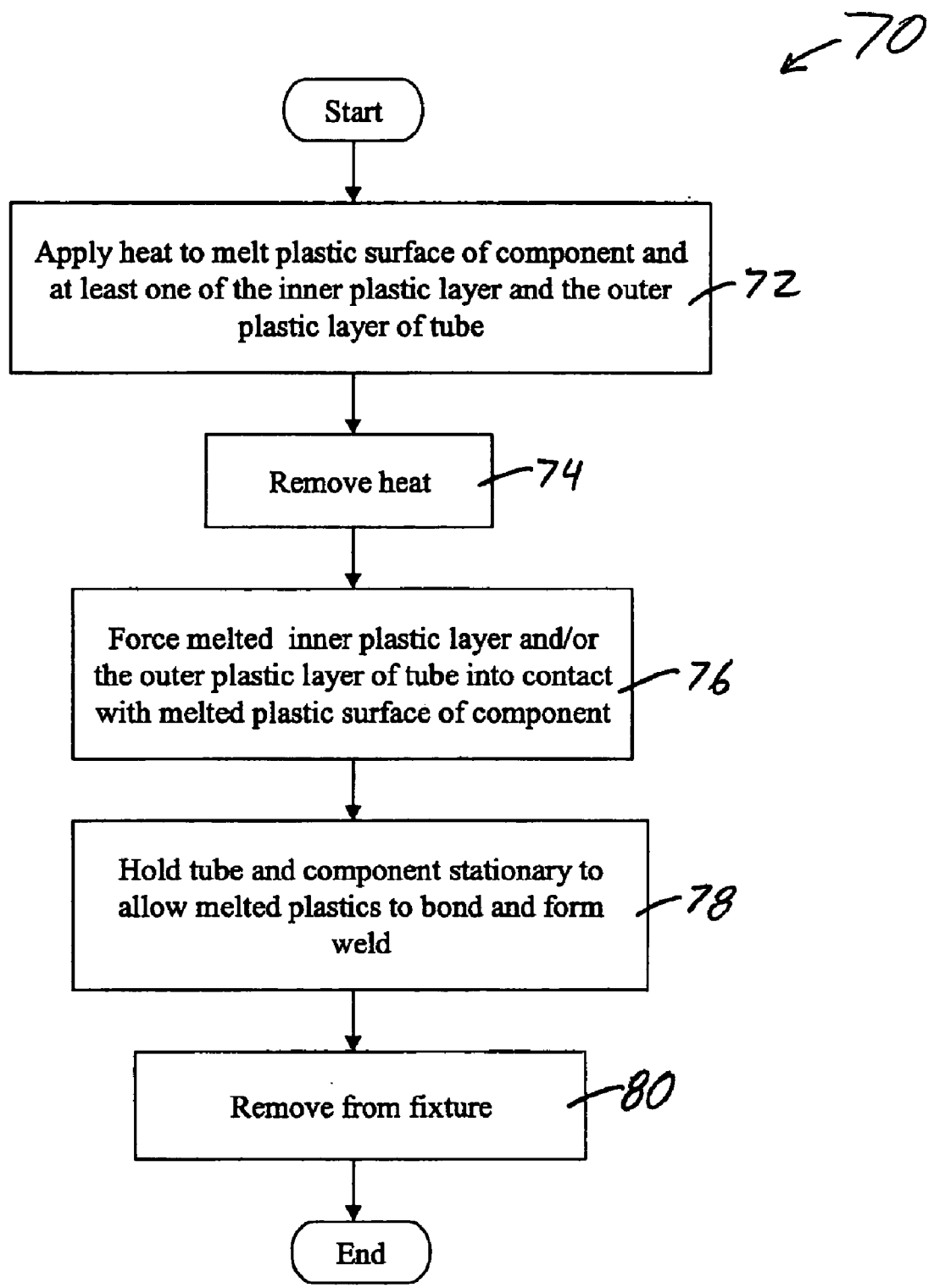
FIG. 6 is a flow chart depicting an alternative method of forming the gas impermeable joint.

FIG. 6 is a flow chart depicting an alternative method 70 of forming the gas impermeable joint 12. Unlike the method 50 of FIG. 5, which uses a frictional method of generating heat, the method 70 of FIG. 6 uses an external source of heat to melt the plastic. In the method 70 of FIG. 6, an external source of heat (e.g., a hot plate) is applied to the one or more plastic surface 32 and/or 34 on the article 16 and to the inner and/or outer plastic layers 20, 22 to melt each of these surfaces (block 72 of method 70). The external source of heat is then removed (block 74) and the melted inner and/or outer layers 20, 22 are forced against the melted plastic surface(s) 32, 34 of the component 16. The component 16 and tube 14 are held stationary to allow the melted plastics to bond and form a weld (block 78), after which the tube 14 and component 16 are removed from the fixture 38 (block 80). The method 70 of FIG. 6 may be used instead of the method 50 of FIG. 5, for example, where the plastic material used in the inner and/or outer plastic layers 20, 22 has a substantially different melting temperature than that of the plastic surfaces 32, 34 on the article 16. The method 50 of FIG. 5 requires that the melting temperature of the materials used in the inner and/or outer plastic layers 20, 22 and the plastic surfaces 32, 34 have a melting temperature that is sufficiently the same (e.g., within 20° F.) so that all of the materials forming the weld are melted by the friction welding process.

Figure 7:
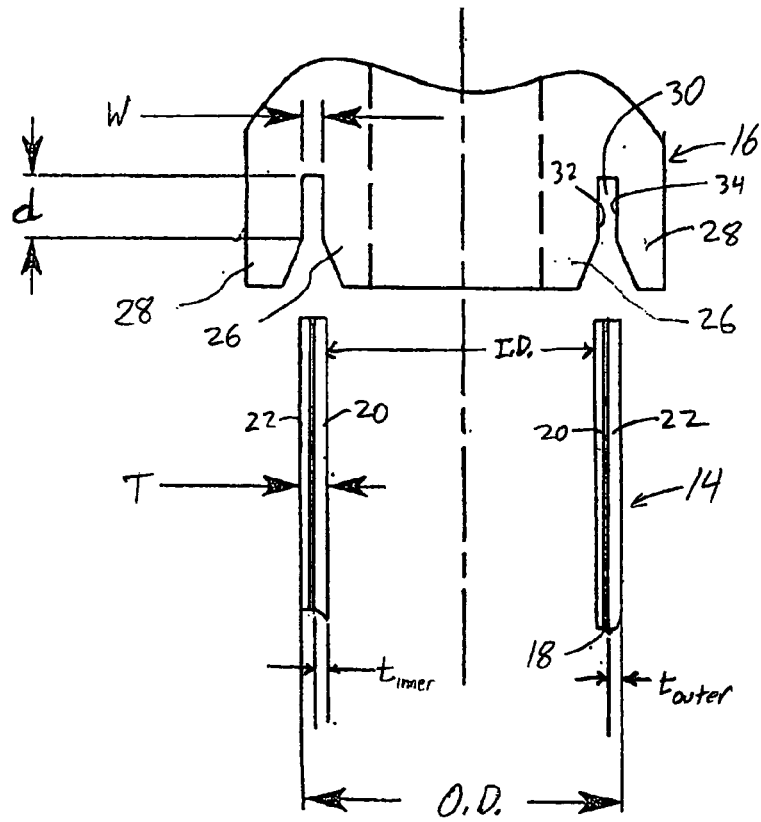
FIG. 7 is a cross-sectional view of the end of the tube separated from the component showing various dimensions of the tube and the component.

FIG. 7 is a cross-sectional view of the end of the tube 14 separated from the component 16 showing various dimensions of the tube 14 and the component 16. The outside diameter (O.D.) and inside diameter (I.D.) of the tube 14 are selected based on the particular application of the tube 14 and component 16. It has been determined that to provide sufficient material to form a weld, the inner and outer plastic layers 20, 22 forming the weld preferably each have a thickness "t" greater than about 0.6 millimeters (about 0.024 inches), and more preferably greater than about 1 millimeter (about 0.039 inches). The maximum thickness "t" of the one or more plastic layers 20, 22 forming the weld is determined based on the requirements of the system 10 (e.g., pressure requirements, temperature requirements, and the like). However, as a practical limit to provide for the flexibility of tube 14, each plastic layer 20 and/or 22 forming the weld may have a thickness "t" less than about 3 millimeters (about 0.12 inches).

The recess 30 has a depth "d", which is the effective depth of the weld. As a result, the depth "d" of the recess may be used to control the strength of the joint 12 (FIG. 1) as needed to meet system 10 requirements.

Figure 8:
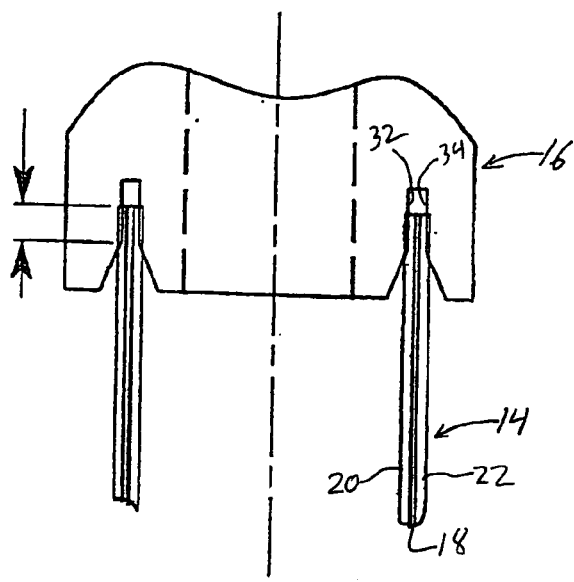
FIG. 8 is a partial cross-sectional view of an end of the tube forced onto the component before welding in accordance with a first embodiment of the invention.

The width "w" of the recess, as well as the outside diameter of the inner protrusion 26 and the inside diameter of the outer protrusion 28, may be selected in relation to the dimensions of the tube 14 to determine which of the surfaces 32, 34 and layers 20, 22 form the weld. For example, these various dimensions may be selected such that the inner plastic layer 20 contacts the outer surface 32 of the inner protrusion 26, and the outer plastic layer 22 contacts the inner surface 34 of the outer protrusion 28, as shown in FIG. 8. As a result, both the inner and outer plastic layers 20, 22 will form the weld with the component 16. In one example of this embodiment, the depth "d" of the recess may be about four times the total thickness "T" of the tube, with the width "w" of the recess being about 0.01 inch less than the total thickness "T". Preferably, the surfaces 32 and 34 are angled relative to each other to provide an included angle of about 1° to about 3°. Where the surfaces 32 and 34 are angled, the width "w" represents the minimum width of the channel.

Figure 9:
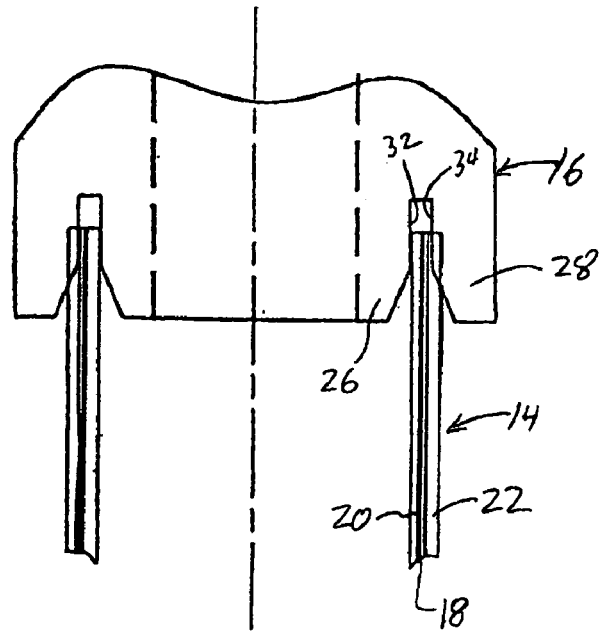
FIG. 9 is a partial cross-sectional view of an end of the tube forced onto the component before welding in accordance with a second embodiment of the invention.

FIG. 9 depicts an embodiment where the weld is formed only between the outer plastic layer 22 and the inner surface 34 of the outer protrusion 28. In this embodiment, the inner protrusion 26 provides internal support to the tube 14, but is not welded to the tube 14. It is contemplated that the component 16 may be formed without the inner protrusion 26, such that the recess 30 is formed only by the inner surface 34.

Figure 10:
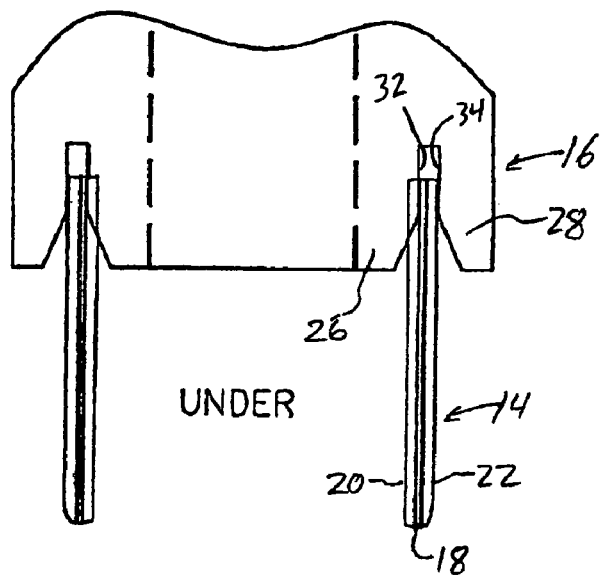
FIG. 10 is a partial cross-sectional view of an end of the tube forced onto the component before welding in accordance with a third embodiment of the invention.

FIG. 10 depicts an embodiment where the weld is only formed between the inner plastic layer 20 and the outer surface 32 of the inner protrusion 26. In this embodiment, the outer protrusion 28 provides external support to the tube 14, but is not welded to the tube 14. It is contemplated that the component 16 may be formed without the outer protrusion 28, such that the recess 30 is formed only by the outer surface 32.

Figure 11:
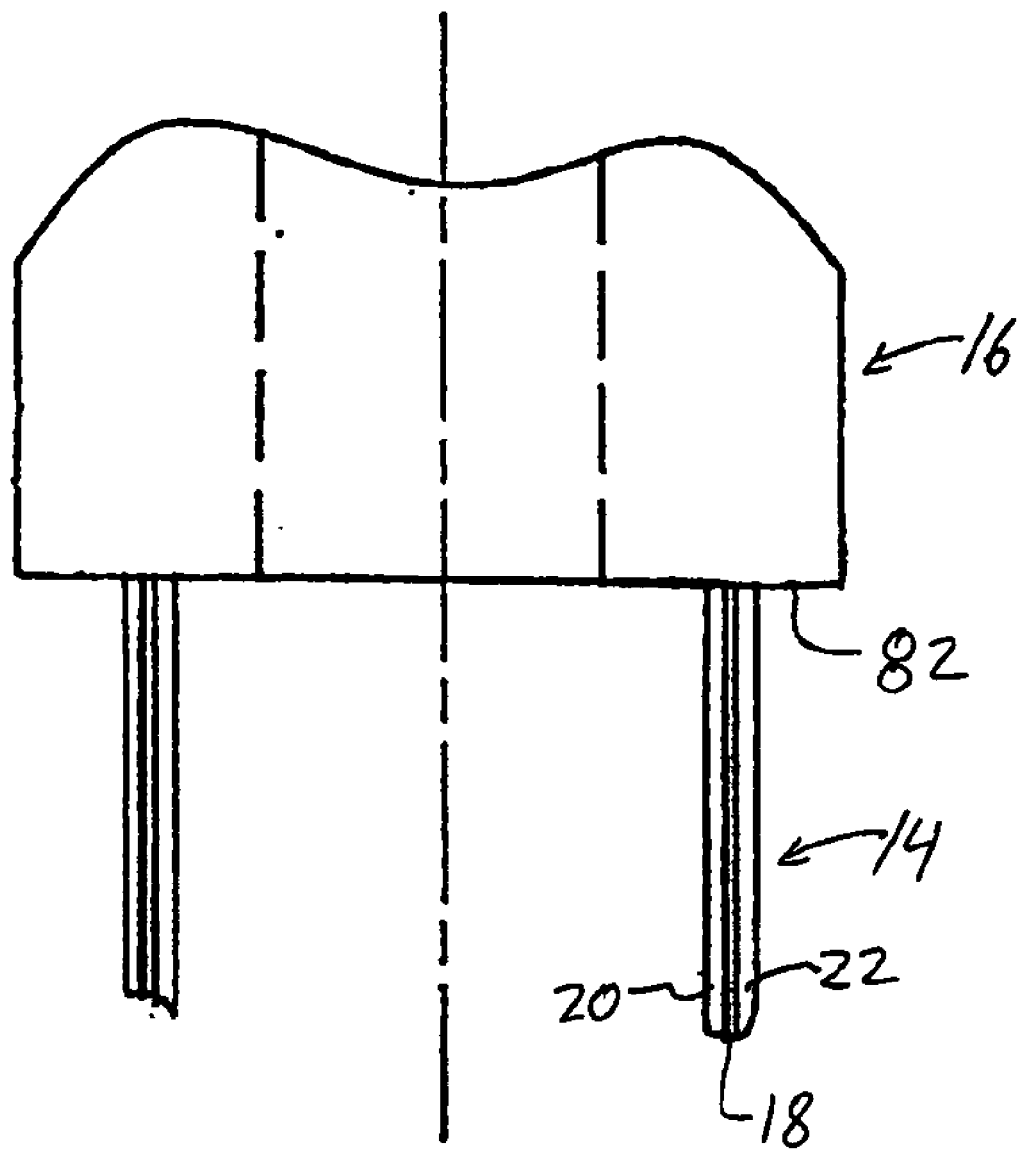
FIG. 11 is a partial cross-sectional view of an end of the tube forced onto the component before welding in accordance with a fourth embodiment of the invention.

FIG. 11 depicts another embodiment where the weld is formed as a butt weld between the tube 14 and the component 16. In this embodiment, the plastic surface is formed on a face 80 of the component 16, and the weld is formed between both the inner and outer layers 20, 22 and the face 80.

Figure 12:
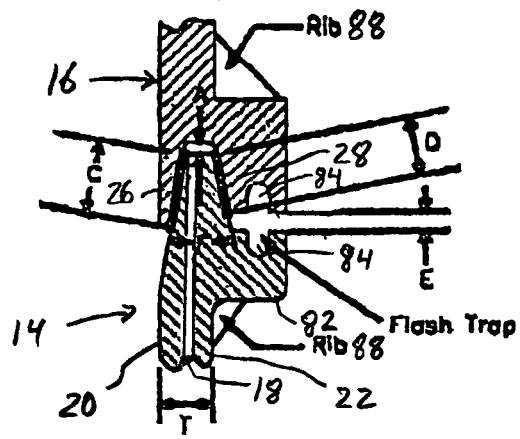
FIG. 12 is a cross-sectional view of a first alternative arrangement of the tube and component before welding.
Figure 13:
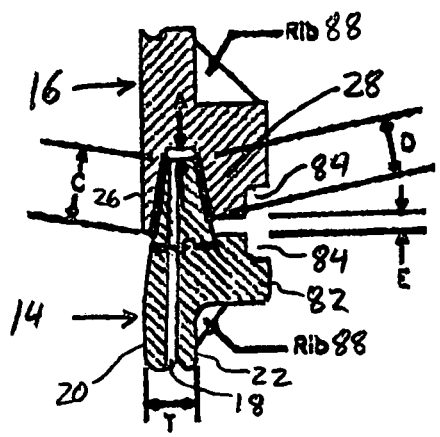
FIG. 13 is a cross-sectional view of a second alternative arrangement of the tube and component before welding.
Figure 14:
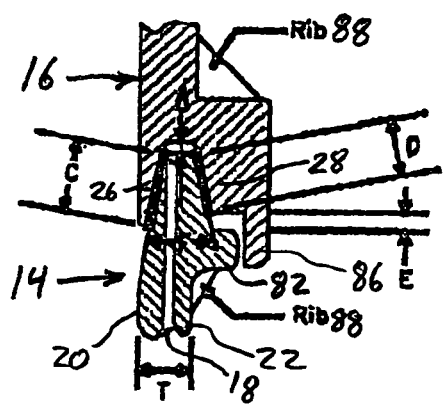
FIG. 14 is a cross-sectional view of a third alternative arrangement of the tube and component before welding.

FIGS. 12–17 depict various arrangements of the tube 14 and component 16 that may be used in forming the joint 12 of the present invention. These arrangements have been found to be especially well suited for use where the tube 14 and component 16 are joined by spin welding. FIGS. 12–17 depict the tube 14 and component 16 just before welding, when the tube 14 is forced against the component 16. In each of FIGS. 12–14, the weld is formed on the inner and outer layers 20 and 22 of the tube 14. Unlike the straight-walled tube 14 used in the embodiment described with reference to FIGS. 7 and 8, the end of the tube 14 used in the arrangements of FIGS. 12–14 is shaped to have an included angle "F" between the contact surface "C" of the inner layer 20 and the contact surface "D" of the outer layer 22. The included angle "F" is preferably between about 20° to about 40°, and more preferably between about 25° to 30°. The arrangements of FIGS. 12–14 are also shown to include various shoulders 82 disposed on the tube 14.

In FIGS. 12–14, the total thickness of the tube 14 is indicated at "T", and the welded surface is indicated by the sum of the contact surface on the inner layer 20, indicated at "C", and the contact surface on the outer layer 22, indicated at "D". Preferably, the welded surface (C+D) is equal to about 1.5×T to about 3.5×T, and more preferably between about 1×T to 2×T. As discussed above, the welded surface may be increased or decreased depending on the required strength of the weld, among other variables. The depth of the weld, as indicated at "A", is preferably between about 0.3×T to about 1.0×T, and more preferably between about 0.5×T to about 0.8×T.

Each of the arrangements in FIGS. 12–14 includes a shoulder 82 protruding radially outward around the circumference of the outer plastic layer 22 of the tube 14. With the tube 14 and component 16 forced together prior to welding, the shoulder 82 is preferably separated from the outer protrusion 28 by a distance "E", which is preferably equal to the depth of the weld "A" plus about 0.01 inch. The shoulder 82 prevents the tube 14 from extending within the component 16 substantially beyond the depth of the weld, "A".

The shoulder 82 may be of various shapes. For example, the shoulder 82 and the outer protrusion 28 may include opposing recesses 84 formed therein, as shown in FIGS. 12 and 13, for receiving excess material formed during the weld. FIG. 14 depicts an arrangement where the outer protrusion 28 includes a lip 86 extending outside the opposing shoulder 82 for aiding in the alignment of the tube 14 and component 16. As shown in FIGS. 12–14, the shoulder 82 and outer protrusion 28 may be supported by ribs 88.

Figure 15:
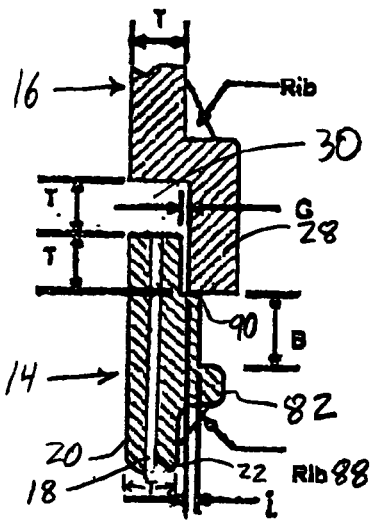
FIG. 15 is a cross-sectional view of a fourth alternative arrangement of the tube and component before welding.
Figure 16:
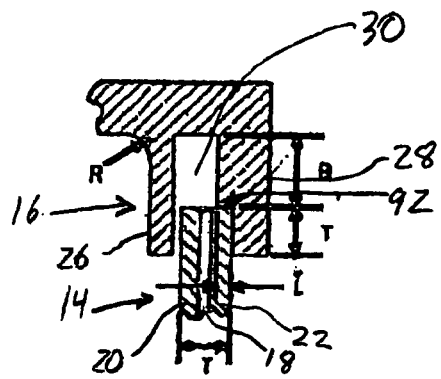
FIG. 16 is a cross-sectional view of a fifth alternative arrangement of the tube and component before welding.
Figure 17:
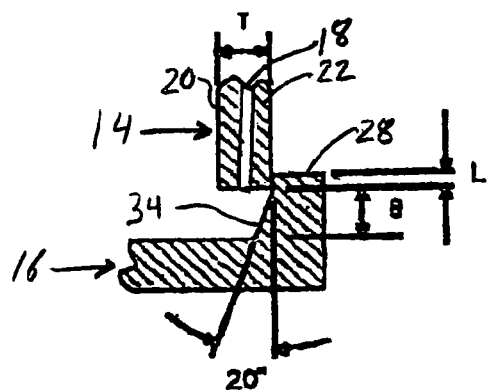
FIG. 17 is a cross-sectional view of a sixth alternative arrangement of the tube and component before welding.

FIGS. 15–17 depict arrangements where the weld is formed along only one of the inner and outer layers 20 and 22 of a straight-walled tube 14. While FIGS. 15–17 depict the weld as being formed on the outer layer 22, it will be appreciated that the weld may alternatively be formed on the inner layer 20. FIG. 15 depicts an arrangement where the outer layer 20 is configured with a first shoulder 90 recessed from a distal end of the tube 14 by a distance equal to the thickness "T" of the tube 14. The distal end of the tube 14 is preferably separated from the end of the recess by a distance equal to the thickness "T" of the tube 14, and is preferably offset from the outer protrusion 28 by an offset distance "G" of about 0.002 inches. The distal end of the tube 14 aids in the alignment of the tube 14 and component 16 during the welding process. The depth of the weld, as indicated at "B", is the distance between the first shoulder 90 and a shoulder 82 formed on the outer layer 22 of the tube 14. The depth of the weld "B" may be between about 1×T to about 2×T, and more preferably about 1.5 T, and may be increased or decreased depending on the required strength of the weld. The interference between the tube 14 and the component 16, indicated at "i", may be between about 0.005 inches to about 0.025 inches, and preferably between about 0.01 inches to about 0.02 inches. The shoulder 82 may be supported by ribs 88.

FIG. 16 depicts an arrangement where the outer protrusion 28 is configured with a first shoulder 92 disposed at a distance from the bottom surface of the channel 30 to establish the depth of the weld "B". The depth of the weld "B" may be between about 1×T to about 2×T, and more preferably about 1.5 T, and may be increased or decreased depending on the required strength of the weld. The first shoulder 92 is preferably offset from a distal end of the outer protrusion 28 by a distance equal to the thickness "T" of the tube 14, thus allowing the outer protrusion 28 to aid in the alignment of the tube 14 and component 16 during the welding process. The interference between the tube 14 and the component 16, indicated at "i", may be between about 0.005 inches to about 0.025 inches, and preferably between about 0.01 inches to about 0.02 inches. The inner protrusion 26 is offset from the inner layer of the tube.

FIG. 17 depicts an arrangement wherein the inner surface 34 of the outer protrusion 28 is angled by about 20 degrees relative to the outer layer 22. The angled inner surface 34 of the outer protrusion 28 has a height that establishes the depth of the weld "B". The depth of the weld "B" may be between about 1×T to about 2×T, and more preferably about 1.5×T, and may be increased or decreased depending on the required strength of the weld. The angled inner surface 34 is preferably offset from the distal end of the outer protrusion 28 by a distance "L", which may be between about 0.020 inches to about 0.040 inches, thus allowing the distal end of the outer protrusion 28 to aid in the alignment of the tube 14 and component 16 during the welding process.

The present invention uses the metallic barrier layer 18 of a tube 14 to improve the gas impermeability of the joint 12 between the tube 14 and a component 16. Advantageously, because the weld is formed with the outer and/or inner plastic layers 20, 22 of the tube 14, the metallic barrier layer 18 extends substantially to the component 16, thus improving the gas impermeability of the joint 12 between the tube 14 and the component 16. The joint 12 is also lightweight and corrosion resistant.

A number of embodiments of the present invention have been described. Nevertheless, it will be understood that various modifications may be made without departing from the spirit and scope of the invention. Accordingly, other embodiments are within the scope of the following claims.

What is claimed is:

1. A method of forming a gas impermeable joint in a fuel fill system, the method comprising:

providing a tube having a metallic barrier layer disposed between an inner plastic layer and an outer plastic layer, the tube and the layers each having a circumference, the outer plastic layer including a shoulder protruding radially outward around at least a portion of its circumference;

forcing at least one of the inner plastic layer and the outer plastic layer into contact with a plastic surface of a funnel portion of the fuel fill system, the funnel portion including an outer protrusion portion surrounding a cylindrical recess, the recess being dimensioned to receive an end of the tube, the plastic surface of the funnel portion being formed within the recess to contact the at least one of the inner plastic layer and the outer plastic layer, the plastic surface of the funnel portion also being formed on the outer protrusion portion to contact the shoulder of the outer plastic layer;

causing at least one of the inner plastic layer and the outer plastic layer to contact the plastic surface formed within the recess;

causing the shoulder of the outer plastic layer to contact the plastic surface formed on the outer protrusion portion; and welding at least one of the at least one of the inner plastic layer and the outer plastic layer and the shoulder of the outer plastic layer with the plastic surface to form the gas impermeable joint.

2. The method of claim 1, wherein the plastic surface is formed on an outer circumference of the outer protrusion.

3. The method of claim 1, the plastic surface is formed on an inner circumference of the outer protrusion.

4. The method of claim 1, wherein the thickness of the at least one of the inner plastic layer and the outer plastic layer before welding is greater than about 0.6 millimeters.

5. The method of claim 4, wherein the thickness of the at least one of the inner plastic layer and the outer plastic layer before welding is greater than about 1 millimeter.

6. The method of claim 1, wherein the thickness of the at least one of the inner plastic layer and the outer plastic layer before welding is between about 0.6 millimeters to about 0.3 millimeters.

7. The method of claim 1, wherein the thickness of the at least one of the inner plastic layer and the outer plastic layer before welding is between about 1 millimeters to about 3 millimeters.

8. The method of claim 1, wherein the inner plastic layer is formed by a first tube, the metallic barrier is formed by an aluminum foil bonded exteriorly about the first tube, and the outer plastic layer is formed by a second tube bonded exteriorly about the aluminum foil; the first tube and the second tube each comprising about 20 percent by weight of EPDM rubber and from about 2 to 9 percent by weight of polybutadiene-maleic anhydride adduct resin.

9. The method of claim 1, wherein the tube includes a reinforcement layer bonded exteriorly about the outer plastic layer.

10. A fuel fill system comprising:
   a tube having a metallic barrier layer disposed between an inner plastic layer and an outer plastic layer, the tube and the layers each having a circumference, the outer plastic layer including a shoulder protruding radially outward around at least a portion of its circumference; and
   a funnel portion in fluid communication with the tube via a joint, the funnel portion including an outer protrusion portion surrounding a cylindrical recess, the recess being dimensioned to receive an end of the tube, a plastic surface of the funnel portion being formed within the recess to contact the at least one of the inner plastic layer and the outer plastic layer, the plastic surface of the funnel portion also being formed on the outer protrusion portion to contact the shoulder of the outer plastic layer, wherein at least one of the inner plastic layer and the outer plastic layer includes a spin weld between it and the plastic surface of the funnel portion to form the joint.

11. The system of claim 10, wherein the plastic surface is formed on an outer circumference of the outer protrusion.

12. The system of claim 10, wherein the plastic surface is formed on an inner circumference of the outer protrusion.

13. The system of claim 10, wherein the thickness of the at least one of the inner plastic layer and the outer plastic layer before welding is greater than about 0.6 millimeters.

14. The system of claim 13, wherein the thickness of the at least one of the inner plastic layer and the outer plastic layer before welding is greater than about 1 millimeter.

15. The system of claim 10, wherein the thickness of the at least one of the inner plastic layer and the outer plastic layer before welding is between about 0.6 millimeters to about 3 millimeters.

16. The system of claim 15, wherein the thickness of the at least one of the inner plastic layer and the outer plastic layer before welding is between about 1 millimeters to about 3 millimeters.

17. The system of claim 10, wherein the inner plastic layer is formed by a first tube, the metallic barrier is formed by an aluminum foil bonded exteriorly about the first tube, and the outer plastic layer is formed by a second tube bonded exteriorly about the aluminum foil; the first tube and the second tube each comprising about 20 percent by weight of EPDM rubber and from about 2 to 9 percent by weight of polybutadiene-maleic anhydride adduct resin.

18. The system of claim 10, wherein the tube includes a reinforcement layer bonded exteriorly about the outer plastic layer.

* * * * *